March 9, 1937.    J. J. LINDINGER    2,073,112
FILLING DEVICE
Filed Oct. 10, 1933
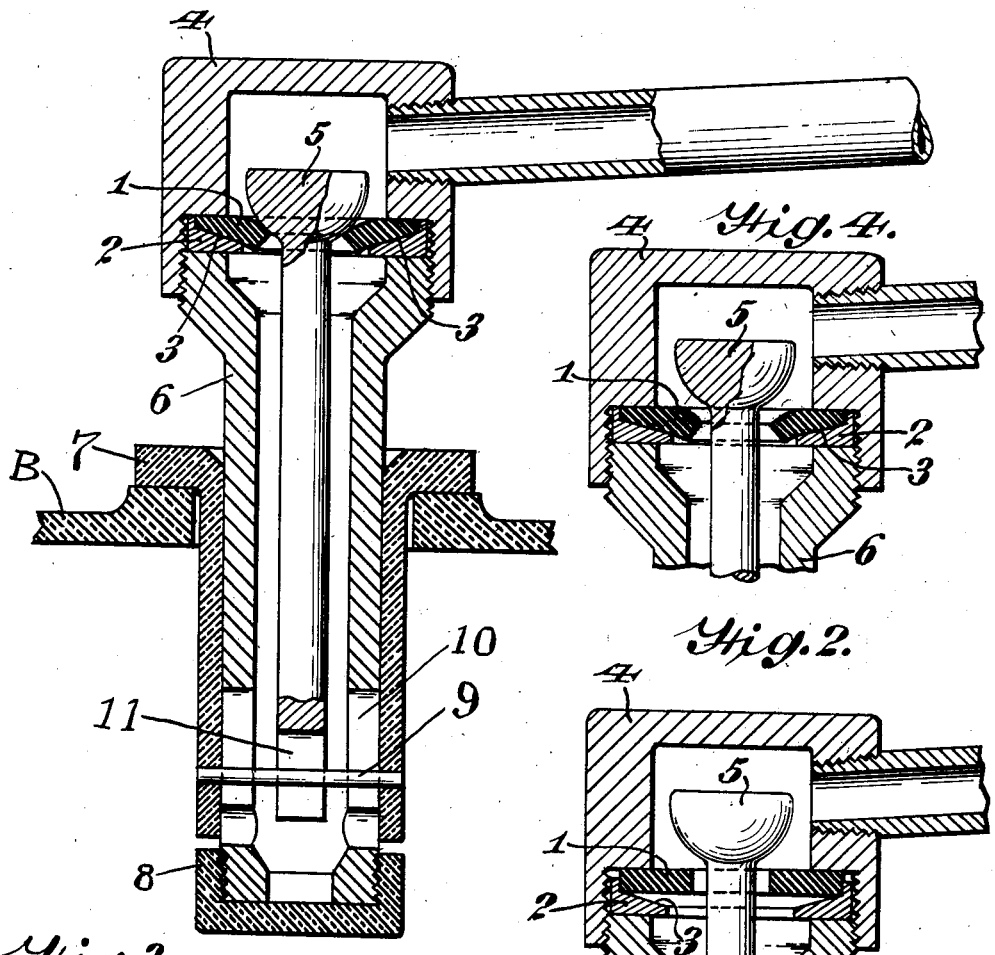
Inventor
John J. Lindinger,
By Augustus B. Stoughton.
Attorney

UNITED STATES PATENT OFFICE 2,073,112

FILLING DEVICE

John J. Lindinger, Philadelphia, Pa., assignor to The Electric Storage Battery Company, Philadelphia, Pa., a corporation of New Jersey Application October 10, 1933, Serial No. 692,963

1 Claim. (Cl. 251—167)

The object of my invention is to provide an improved valve seat for a manually operated filling device especially adapted for use with electric storage batteries.

My improved valve seat consists essentially of a washer of soft rubber, or like material, which is compressed between portions of the valve casing to assume a rounded cup-shape to make contact with a hemispherical valve over a greater surface area than would otherwise be the case.

The present invention is an improvement over the subject-matter of my prior copending applications, Serial Nos. 592,507 and 624,169.

For a further exposition of my invention, reference may be had to the annexed drawing and specification at the end whereof the novel features of my invention will be specifically pointed out and claimed.

In the drawing:

Fig. 1 is a view through my device, principally in vertical cross-section;

Fig. 2 is a view through a portion of my device, principally in vertical cross-section, showing the device in another position;

Fig. 3 is a view through a portion of my device, principally in vertical cross-section, showing a modification; and Fig. 4 is a partial view in vertical cross section.

Referring to Figs. 1, 2, and 4, there is shown a filling device having a valve seat consisting of a flat, soft, rubber washer 1, supported in a cavity or sloping face of a cup-shaped washer or support 2, whose upper, sloping face 3 is frusto-conical in shape. In Fig. 2 the rubber washer 1 is shown in its normal shape before compression is applied to it by screwing down the cap 4 on the body 6 by means of the screw-threaded engagement therebetween. This applies compression to the valve seat 1. When the cap 4 is screwed down tightly, so as to compress the rubber washer or valve seat 1, the latter assumes the shape shown in Fig. 4, the upper surface being then forced down into a rounded, cup-shape, so that the hemispherical surface of the valve 5, when it drops to its seat on the rubber washer 1, makes contact with the latter over a considerable area rather than on a restricted edge, as would be the case if the rubber washer 1 retained its original shape as shown in Fig. 2.

Intermediate its ends, body 6 carries a sliding sleeve 7, and, at its lower end, a stationary cap 8. Sleeve 7 carries a pin 9 which rides in slots 10 in body 6, and in slot 11 in valve 5.

The operation of my device is as follows. When it is desired to fill a storage battery or other receptacle, the filling device is inserted into the battery. When sleeve 7 contacts with the battery cover B, the lower ends of slots 10 are opened, to permit escape of any liquid within body 6. Further, the movement of sleeve 7 forces pin 9 into contact with the upper end of slot 11, and thus opens valve 5 into the position shown in Fig. 4 without, of course, disturbing the valve seat, except as the weight of valve 5 is released therefrom. This permits fluid to enter from cap 4 through the opening in valve seat 1, and through the lower ends of slots 10 into the battery. When liquid in the battery has risen to a sufficient level, the filling device is lifted, thus closing valve 5 and afterwards closing the lower ends of slots 10. Since slots 10 are open after valve 5 has closed, the drainage of any liquid within body 6 through slots 10 is permitted, and upon the closing by sleeve 7 of slots 10 further drip or leakage of liquid is prevented.

In Fig. 3 there is shown a modification of my device, in which body 6 has its upper end formed directly with a sloping face 3, so as to eliminate the cup-shaped washer or support 2 shown in Figs. 1 and 2.

I do not intend to be limited save as the scope of the prior art and of the attached claim may require.

I claim:

A filling device comprising, in combination, a cap, a hollow body having adjustable engagement with said cap, a valve located within said cap and said body and having a hemispherical surface portion, an annular support located between said body and said cap and having an upstanding rim and a sloping face within said rim, and an annular, soft rubber washer located within said rim and clamped between said sloping face and said cap and having a rounded valve seat for engagement with a portion of said hemispherical surface of said valve.

JOHN J. LINDINGER.